United States Patent Office 3,320,197
Patented May 16, 1967

3,320,197
PROCESS OF PRODUCING CONCENTRATED AQUEOUS EMULSIONS OF WATER-INSOLUBLE SUBSTANCES AND EMULSIONS PRODUCED BY SUCH PROCESS
Heinz Enders, Stadtbergen, near Augsburg, and Hans Deiner, Augsburg, Germany, assignors to Chemische Fabrik Pfersee G.m.b.H., Augsburg, Germany, a firm of Germany
No Drawing. Filed Mar. 18, 1964, Ser. No. 352,969
Claims priority, application Germany, Mar. 26, 1963, C 29,477; Apr. 6, 1963, C 29,593
7 Claims. (Cl. 260—29.2)

This invention relates to emulsions and a process of producing them and refers more particularly to a method of manufacturing concentrated aqueous emulsions.

It is known in prior art to emulsify fats and oils with aqueous solutions of formaldehyde precondensates. However, these emulsions do not have sufficient stability despite the use of large amount of condensation products. Prior art literature, such as the British Patent 596,154, or the German Patent 956,990, also describe emulsification of paraffin with acid solutions of formaldehyde condensation products or with their water-soluble salts. The required amounts of such acid condensation products are also substantial in comparison with the amounts of paraffin or wax, so that with a 100% product only one to double the amount of paraffin by weight can be brought into emulsion.

Many suggestions were also made in prior art for the manufacture of aqueous emulsions of organopolysiloxanes. However, the usual emulsifying agents have the drawback that they impair through their surface active properties the hydrophobic action of the silicones, particularly in the treatment of textiles. Furthermore, some of these emulsifying agents are weakly alkaline and thus facilitate the decomposition of hydrogen-polysiloxanes. Finally, difficulties arise due to the incompatibility of the emulsions with the metal salts necessary as hardening means for the siloxanes. Then the particles of the emulsions are immediately increased.

An object of the present invention is to improve prior art processes and products.

Other objects will become apparent in the course of the following specification.

The present invention is based, in part, on the discovery that water-soluble or in water-dispersible, neutralized or acidified reaction products of aliphatic or aromatic compounds containing epoxy groups with di- or polyamines of aliphatic, cycloaliphatic or heterocyclic series constitute excellent emulsification and dispersing means for water-in-soluble substances of very different types.

It was also found that in many instances particularly advantageous are further action products of low aldehydes, particularly formaldehyde, with said reaction products of compounds containing epoxy groups and polyamines.

The water-insoluble substances which are to be emulsified or dispersed, can be of organic or inorganic nature. By way of example, they can be saponifiable fats, oils and waxes, their free acids, paraffin hydrocarbons, chloroparaffins, chlorocaoutchouc, pentachlorophenolesters of higher carbonic acids, polyethylenes, water-insoluble cellulose ethers or esters, polyvinylalcohols, their esters, polyvinylchloride, polyacrylic acids or their esters, fluorated compounds as well as pigments of organic or inorganic nature. Mixtures of these substances or their organic solutions as well, are also usable.

A particular embodiment of the present invention pertains to the emulsification of organopolysiloxanes of the general formula

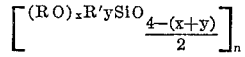

wherein R and R' are hydrogen or alkyl, -aryl, -cycloalkyl or acyl residue, $x+y$ is a number between 1.5 and 3 and $n$ is a number above 1.

The reaction products of the present invention or their further condensation products with aldehydes have a considerably greater emulsification action than all soluble condensation products known in prior art, i.e. they can be used to bring 5 to 15 times the amount of water-insoluble substances in excellent stable emulsions and dispersions.

The amount of condensation products used for the emulsification is preferably 2 to 10% of the total weight of the emulsion. These percentages pertain to the water-free condensation product of di- and/or polyamines and polyepoxy-compounds.

The emulsions produced in accordance with the present invention can be used for a variety of purposes. They have the advantage that the condensation products used as the emulsifier are crosslinked when heated to higher temperatures without the addition of a special hardening agent and thus stabilize the emulsified substances against the attack of solving substances, such as water and organic solvents. In addition, when emulsified or dispersed substances are used, it is possible to carry out a reaction with the emulsifying agents themselves.

The use of the emulsions obviously depends upon the type of the substances being emulsified. They can be used for coatings, colored glues or pressed masses, or for the treatment of fibers, particularly those of textiles of all types.

Emulsions of corresponding water-insoluble substances, a series of which has already been mentioned, are used depending as to whether finishing agents, dyes, flame resisting or water-repellent finishes are involved. As finishing agents oily and fatty substances, cellulose derivatives, or polymer compounds can be used; dyes may consist of corresponding pigment colorings; flame resisting finishes may consist of chloroparaffin, chlorocaoutchouc or antimony oxide; non-rotting finishes may consist of pentachlorophenol ester, while water-repellent finishes may be organopolysiloxane paraffins, waxes, high molecular fatty acids or mixtures of such substances.

The water-repellent property is primarily of particular interest for textiles. By way of example, water-repellent effects are attained with an acidified emulsion containing 20% paraffin and 2% of a water-soluble reaction product of glycidyl ether of 4,4'-dioxy-2,2'-diphenylpropane with an epoxide number of 0.43 and ethylene diamine, after diluting 20 times with water and without the addition of the salt of a polyvalent metal, such as aluminium or zirconium, whereby these water-repellent effects are already close to those which can be attained with now generally used paraffin emulsions containing aluminium salts. If a small amount of about 5 gr. to 15 gr. per liter of a crosslinking synthetic resin pre-condensate, such as a methylol compound of etylene urea, is added to the bath, the water-absorption value according to the Bundesmann sprinkling test, is very greatly diminished and excellent water-repellent effects are attained; for example, in the case of a cotton poplin with 7% to 8% water absorption, the addition of zirconium salts or such of aluminium or titanium greatly improves wash resistance;

the fabric after 3 soap washings still has a water absorption of 9% to 10%.

Emulsions of organopolysiloxanes prepared in accordance with the present invention are particularly suitable for making textiles water-repellent, The use of these emulsions results in a series of advantages. For example, abrasion fastness of dyes on polyester fibers does not become worse, although this is the case with prior art silicon impregnations. Furthermore, the emulsions of the present invention do not require any catalysts for the hardening of the organopolysiloxane and produce even after a single application, for example, on cotton, a substantial improvement in crease resistance. The storage durability of such emulsions which contain hydrogen siloxanes, particularly when aldehyde reaction products are used as emulsifiers, is considerably better than that of prior art emulsions.

The emulsifying compounds are produced by heating aliphatic or aromatic glycidyl ethers with aliphatic, cycloaliphatic or heterocyclic di- or polyamines, preferably in the presence of an organic solvent which is mixable with water, to temperatures of about 40% C. up to the boiling point of the solvent, as long as there is a clear or slightly turbid solution. Then it is neutralized or brought to an acid pH value of about 5 or 6 by acids which volatilize in the heat, such as low aliphatic carbonic acids, or hydrocholric acid. Similar products may be also produced by a volatile acid by heating glycidyl ether with the polyamine salt.

It is also possible to further react these products in an acid state by heating after the addition of aldehydes, particularly formaldehyde or glyoxal; however, no hardening with precipitation of insoluble large particles should be allowed to take place.

However, turbed solutions are still usable for emulsification before or after treatment with the aldehyde, so long as they constitute fine-particled dispersions which are still stable in the concentrated as well as diluted state.

As examples of aliphatic or aromatic glycidyl ethers can be named those of polyvalent aliphatic alcohols, such as ethylene-, propylene-, and butylene glycol, glycerin, 1-methyl-2,3,4-trioxypropane, or those of polyvalent phenols, such as 1,4-dioxy-benzol, resorcine, 3,8-dinaphtol, 4,4'-dioxydiphenyl-methane or 4,4'-dioxydiphenylpropane.

Examples of di- or polyamines are alkylene diamines, such as ethylene-, propylene-, butylene- or N-ethylproylendiamine, polyalkylenepolyamines, such as diethylenetriamine, triethylenetetramine, dipropylenetriamine, or ω,ω'-diethylene-triamine, cycloaliphatic diamines, such as 1,4-diaminocyclohexane, heterocyclic compounds with at least 2 secondary amino groups, such as piperazine, and finally ethyleneimine. The relative amounts of glycidyl ethers and polyamines can be varied within great limits. There can be 3 epoxide groups of glycidyl ether for each hydrogen atom of the polyamine which is capable of reaction, or, reversely, the amount of hydrogen atoms of the polyamine can be equal to or greater than the number of epoxide groups. One can go as high as 10 amine-hydrogen atoms for each epoxide group, while particularly suitable are reaction products with 1.5–4 amino-hydrogen atoms per epoxide group.

Among aldehydes primarily suitable are formaldehyde and glyoxal, although croton aldehyde or acetaldehyde can be also used. Their amounts range between 10% and 100%, particularly 30% to 50% of the weight of the condensation product of compounds containing epoxide groups and polyamines. As a rule, the reaction with the aldehydes is carried out at temperatures ranging between 60° C. and 80° C. during one hour.

The following examples are given by way of exemplification only:

Example 1

160 gr. of an aqueous solution, the production of which is described hereinbelow, are heated to 70° C. and are thoroughly mixed with a mixture of 260 gr. paraffin (Fp 52–54°) and 70 gr. perchloroethylene heated to the same temperature, whereupon the final mixture is treated in a high pressure homogenizing machine. Then a solution of 6 gr. acetic acid (of 60%) in 160 ml. water, which has been heated to 70° C., is added to the mixture and the emulsion is stirred when cold. It can be diluted with water to any desired extent; by way of example, after a short subsequent heating to about 150° C. it imparts to textiles noteworthy water-repellent properties.

The solution used for emulsification can be produced by heating for about 40 minutes 100 gr. of a glycidyl ether of 4,4'-dioxydiphenylpropane (epoxide number 0.43) with 20 gr. ethylene diamine (80%) in 160 ml. methanol to 40° C. to 50° C., whereupon is added a mixture of 620 ml. of water and 100 gr. of a 60% acetic acid.

Example 2

195 gr. paraffin (Fp 52–54°) are melted with 35 gr. montanic acid ($S_z$ 125) and 100 gr. toluol; this solution having a temperature of about 70° C. is stirred by means of a turbo mixed along with an aqueous solution, the production of which is described herein below and which also has a temperature of 70° C. Then the mixture is homogenized and a solution of 3 ml. formic acid is stirred into 260 ml. water. The resulting emulsion is fine-particled, stable and can be easily dissolved with water. It also can be used for making textiles water-repellent, whereby these effects and their permanency after cleanings can be greatly improved by the addition of small amount of methylolamidoazolidone and zirconium acetate.

The emulsifying solution was produced by a further treatment of 200 gr. of the reaction product of glycidyl ether and ethylene diamine described in Example 1 with 50 gr. of a 37% aqueous formaldehyde solution for 1 hour at 60° C. to 70° C.

Example 3

100 gr. dimethylsiloxane having a viscosity of 680 cp. at 20° are dissolved in 120 gr. perchloroethylene and are stirred into a mixture of 70 gr. of a reaction product the manufacture of which is described hereinbelow with 90 gr. water. The resulting pre-emulsion is again diluted with 240 gr. water and 6 gr. formic acid and is homogenized.

The solution used for emulsification is produced by mixing 176 gr. of a glycidyl ether of ethyleneglycol which contains 0.57 epoxy groups per 100 gr., with 200 ml. methanol and 62 gr. diethylenetriamine, heating for 6 minutes to 60° C. in a reflux condenser, then cooling and setting it to pH 6 by a 10% acetic acid.

Example 4

130 gr. of silicon caoutchouc dissolved in the same amount by weight of test benzine are thoroughly stirred with 200 gr. of an epoxy-polyamine compound and 400 gr. water and are thereupon homogenized. This emulsion is also very stable.

The solution of the epoxy-polyamine compound is produced by heating 144 gr. of a glycidyl ether of glycerine which contains 0.7 epoxy groups per 100 gr., along with 200 gr. dioxane and 162 gr. ethyleneimine for 30 minutes to 45° C. to 50° C., whereupon the resultant products after cooling is set to pH 7 with diluted acetic acid.

Example 5

150 gr. of a mixed polymerizate of hydrogen siloxane and ethyl siloxane are dissolved in 100 gr. of methylene chloride and are mixed with a rapid stirrer with 160 gr. of a hereinafter described emulsion of a pre-condensate as well as 500 gr. water and 8 gr. glacial acetic acid and thereupon homogenized. The resulting emulsion has a pH of 4.2 and is also very stable.

The emulsion of the pre-condensate is produced by heating 40 gr. of the glycidyl ether of the type described in Example 1 with 5 gr. diethylene triamine and 24 ml. methanol for 10 minutes to 45° C.; thereupon 4 ml.

glacial acetic acid are added, the mixture is again heated for 10 minutes at 45° C. and then after addition of 8 ml. glacial acetic acid is diluted with water to 400 gr. The result is a very small-particled emulsion.

*Example 6*

115 gr. poly-acrylic acid-methyl ester are dissolved in the same amount by weight of benzol; the solution is stirred into 230 gr. of an acid aqueous solution of a reaction product of dioxydiphenylpropane and ethylene diamine, as described in Example 1; then 350 ml. water and 10 ml. glacial acetic acid are added and the whole is homogenized.

*Example 7*

200 gr. of a solution of a condensation product the manufacture of which is described hereinafter, are stirred with 325 gr. of a 30% solution of acetyl cellulose, which is suitable for lacquers, into methylcyclohexanon and homogenized after adding 200 ml. of a 4% acetic acid.

The solution of the condensation product is produced by heating in a reflux condenser for one half hour 20 gr. of a glycidyl ether of 4,4'-dioxydiphenyl-methane containing 0.43 epoxy groups and 4.8 gr. diethylenetetramine, 2 gr. glacial acetic acid and 30 ml. isopropanol at 60° C.; then further 10 ml. glacial acetic acid are added and then cold water is added to provide 200 gr.

*Example 8*

1500 gr. pentachlorophenyl-lauric acid ester are melted, mixed with 500 gr. toluol and are then thoroughly stirred at 70° C. with a solution which is described hereinafter and which is also heated to 70° C. This mixture is homogenized by means of a high pressure emulsifying machine and is diluted with 2 liters water containing 20 ml. acetic acid. The resulting emulsion is very finely particled and stable, and can be diluted with water. It is very well suited for impregnating organic materials to make them safe from rotting.

The solution which is used for emulsification, is produced by heating 176 gr. of a glycidyl ether of ethylene glycol, which is made in the known manner and which contains 0.57 epoxy groups per 100 gr., with 86 gr. N-amino-ethyl-piperazine in 200 ml. glycolmonomethyl ether for 10 minutes to 60° C.; then the reaction mixture is cooled, is set to pH 6 with a 10% acetic acid and is then diluted with water to 2000 gr.

*Example 9*

160 gr. of an aqueous solution, the production of which will be described hereinafter, are stirred in with a solution of 128 gr. of a low polymer hydrogenpolysiloxane, which at 20° C. has a viscosity of 50 cp., in 122 gr. perchloroethylene. This pre-emulsion is thereupon diluted with a solution of 6 gr. of a 60% acetic acid in 240 ml. water and then the whole is homogenized. Then a very fine-particled opalescent emulsion is produced which is very liquid and has a pH of 4.2. It can be stored unchanged for at least one half year.

The above mentioned aqueous solution is produced by heating for 40 minutes to 40° C. to 50° C. a glycidyl ether of 4,4'-dioxydiphenyl-2,2'-propane with 0.43% epoxy groups with 20 gr. of 85% ethylene diamine in 160 ml. methanol in a reflux condenser, followed by adding a 10% acetic acid until the pH value is 5.

*Example 10*

230 g. of an aqueous condensation solution, the production of which will be described hereinafter, are stirred with 105 gr. of a mixed polymer of hydrogen-and methylsiloxane having a viscosity of 180 cp. at 20° C. and 95 gr. trichloroethylene, as well as 300 gr. water and 6 gr. acetic acid, whereupon the mixture is homogenized. The emulsion which is thus produced has a pH of 4 and is very finely-particuled and stable.

The aqueous pre-condensation solution used herein is produced by heating 100 gr. of a glycidyl ether, as described in Example 1, with 50 gr. diethylene-triamine and 160 gr. methanol during 40 minutes to about 50° C.; then 250 gr. of an 8.5% acetic acid are added, followed by a further heating for 25 minutes to 65° C. and the addition of 450 gr. of an 8.5% acetic acid while cooling.

*Example 11*

A stable well dilutable emulsion can be also produced by mixing and homogenizing 130 gr. chloroparaffin and 120 gr. of an aqueous acid solution of a reaction product of ethylene glycol glycidyl ether and diethylenetriamine, followed by stirring in 200 ml. of a 3% aqueous acetic acid; the emulsion, among other qualities, is well suited to make fibrous materials flameproof.

The reaction product is produced by heating for a short time a mixture of 176 gr. of glycidyl ether of ethylene glycol (0.57% epoxy groups), 62 gr. diethylenetriamine and 200 ml. methanol to 60° C. and adjusting the pH to 6 by a 10% acetic acid.

*Example 12*

A pigments-containing emulsion can be produced by stirring 180 gr. chloroparaffin at a higher temperature in 160 gr. of a solution, the manufacture of which is described in Example 1, adding a solution of 6 gr. of a 60% acetic acid in 150 ml. water, said solution having been heated to 60° C., whereupon the entire mixture is homogenized after the addition of 60 gr. finely pulverized antimonoxide.

*Example 13*

A rapid stirrer is used to stir a molten mixture of 65 gr. paraffin (Fp=58–60°) and 65 gr. polyethylene wax (Fp 105°) in 160 gr. of an aqueous solution of a reaction product of ethyleneglycol glycidyl ether and diethylenetriamine, the composition of which is described hereinafter. Then a mixture of 240 ml. water and 5 ml. concentrated formic acid is added after the mixture has been heated to 70° C., and the whole is homogenized. The emulsion thus produced is stable and can be diluted with water.

The solution of the emulsified product is produced by heating 100 gr. of a glycidyl ether of dioxydiphenylpropane (0.43 epoxy groups) and 20 gr. of an 80% ethylene diamine in the presence of 160 ml. methanol in a reflux condenser for about 40 minutes to 40° C.–50° C. Thereupon a 9.5% acetic acid is added, the mixture is heated for 25 minutes to about 65° C. and after cooling 450 ml. of a 10% acetic acid are added. The opalescent solution has a pH of 5.

*Example 14*

100 gr. of a solution which is described hereinafter, are heated to 80° C. and then a rapid stirrer is used to stir in 100 gr. of molten N-ethylamide of perfluoroctane sulfonic acid. This mixture is treated in a high pressure homogenizing machine and brought to 500 gr. with water. The emulsion which is thus obtained, can be diluted to any extent with water, it is stable and finely particled. By way of example, it is well suited to make paper oil-repellant.

To produce the solution used herein, 124 gr. resorcine glycidyl ether containing 0.8 epoxy groups per 100 gr. ether, are heated in the presenec of 120 gr. acetone with 60 gr. diethylentriamine for one hour to 40° C. After cooling, the pH is set to 6 with diluted hydrochloric acid and the solution is diluted with water to 1200 gr.

*Example 15*

A thoroughly stirred mixture of a solution described hereinbelow and 2.5 kg. linseed oil are treated in a high pressure homogenizing machine and are brought to 10 kg. with water.

The solution used for the emulsion is produced by reacting 150 gr. of a glycerine glycidyl ether having an epoxy number of 0.7 with 70 gr. of 1,3-diaminocyclohexane in 180 gr. ethanol for 10 minutes at 65° C., whereupon this solution is neutralized with a 5% acetic acid. Then are added 100 gr. of a 40% aqueous glyoxal solution, the mixture is heated for 1 hour to 70° C. and then water is added to provide 2.21.

*Example 16*

A rapid stirrer is used to mix 290 gr. of a condensate solution described hereinbelow with 130 gr. of a hydrogen siloxane dissolved in 120 gr. toluol and with 110 ml. water containing 12 gr. acetic acid. The pre-emulsion is homogenized and is very stable.

The pre-condensate solution used for emulsification is produced by heating 100 gr. of the reaction product of glycidyl ether and ethylene diamine described in Example 1 and reacted with acetic acid, after the addition of 50 gr. of 37% aqueous formaldehyde solution, for 1 hour in a reflux condenser to 60° C. to 70° C., whereupon the solution is cooled.

It is apparent that the examples described above have been given solely by way of exemplification and not by way of limitation and that they are capable of many variations and modifications within the scope of the present invention. All such variations and modifications are to be included within the scope of the present invention.

What is claimed is:

1. The process of producing concentrated aqueous emulsions of organic or inorganic water-insoluble substances by intimately mixing them with concentrated aqueous solutions of synthetic resin pre-condensates, which comprises the steps of forming said pre-condensate by heating compounds selected from the class consisting of aliphatic and aromatic compounds containing epoxy groups with polyamines selected from the class consisting of aliphatic, cycloaliphatic and heterocyclic polyamines to yield said pre-condensates of a degree of condensation characterized by its ability to form in water clear to opalescent soluble condensation products, admixing said pre-condensates with water to form an aqueous solution thereof, bringing the solution of said products by a volatile acid to a pH of 5–7, and then emulsifying by intimately mixing 5–15 parts by weight of said water-insoluble substances with 1 part by weight of said condensation products.

2. The process in accordance with claim 1, wherein said water-insoluble substances consist of organopolysiloxanes.

3. An emulsion prepared in accordance with the process described in claim 1.

4. The process of producing concentrated aqueous emulsions of organic or inorganic water-insoluble substances by intimately mixing them with concentrated aqueous solutions of synthetic resin pre-condensates, which comprises the steps of forming said pre-condensate by heating compounds selected from the class consisting of aliphatic and aromatic compounds containing epoxy groups with polyamines selected from the class consisting of aliphatic, cycloaliphatic and heterocyclic polyamines to yield said pre-condensates of a degree of condensation characterized by its ability to form in water clear to opalescent soluble condensation products, admixing said pre-condensates with water to form an aqueous solution thereof, bringing the solution of said products by a volatile acid to a pH of 5–7, reacting said reaction products with low aliphatic aldehydes to form water-soluble condensation products, and then emulsifying by intimately mixing 5–15 parts by weight of said water-insoluble substances with 1 part by weight of said condensation products.

5. The process in accordance with claim 4, wherein said water-insoluble substances consist of organopolysiloxanes.

6. The process in accordance with claim 4, wherein said low aliphatic aldehydes consist of formaldehyde.

7. An emulsion prepared in accordance with the process described in claim 4.

References Cited by the Examiner

UNITED STATES PATENTS 2,909,448  10/1959  Schroeder _____ 260—29.2

FOREIGN PATENTS 1,279,517  11/1961  France _____ 260—29.2
1,299,236  6/1962  France _____ 260—29.2

MURRAY TILLMAN, *Primary Examiner.*

J. C. BLEUTGE, *Assistant Examiner.*